United States Patent [19]

Lewis et al.

[11] Patent Number: 5,639,576
[45] Date of Patent: Jun. 17, 1997

[54] HETEROATOM INCORPORATED COKE FOR ELECTROCHEMICAL CELL ELECTRODE

[75] Inventors: Irwin Charles Lewis, Strongsville; Ronald Alfred Greinke, Medina, both of Ohio

[73] Assignee: UCAR Carbon Technology Corporation, Danbury, Conn.

[21] Appl. No.: 654,661

[22] Filed: May 29, 1996

[51] Int. Cl.$^6$ .................................................. H01M 4/38
[52] U.S. Cl. ........................................ 429/218; 429/194
[58] Field of Search ................................. 429/218, 194

[56] References Cited

U.S. PATENT DOCUMENTS

| | | | |
|---|---|---|---|
| 3,755,193 | 8/1973 | Luft et al. | 429/218 X |
| 5,162,170 | 11/1992 | Miyabayashi et al. | 429/94 |
| 5,176,969 | 1/1993 | Miyabayashi et al. | 429/212 |
| 5,527,643 | 6/1996 | Sonobe et al. | 429/218 |

FOREIGN PATENT DOCUMENTS

| | | |
|---|---|---|
| 0520667A1 | 12/1992 | European Pat. Off. . |
| 0613197A1 | 8/1994 | European Pat. Off. . |
| 1-204361 | 8/1989 | Japan . |

OTHER PUBLICATIONS

Reactivity of Lithium Intercalated into Petroleum Coke in Carbonate Electrolytes, by M. Jean et al, J. Electrochem. Soc., vol. 143, No. 2 Feb. 1996 (Jean et al).
Processing and Characterization of Carbon Electrodes for Li Ion Batteries, by X. Chu et al, The Electrochemical Society Proceedings, vol. 94–28, (Chu et al). (no date).
Lithium Polymer Electrolyte Rechargeable Battery, by D. Fauteux, The Electrochemical Society Proceedings, vol. 94–28, (Fauteux). (no date).

The Dependence of the Performance of Li–C Intercalation Anodes for Li–Ion Secondary Batteries on the Electrolyte Solution Composition, by Y. Ein–Eli, et al, Electrochimica Acta, vol. 39, No. 17, pp. 2559–2569, 1994, (no month) (Ein–Eli et al).
Anodic Oxidation of Propylene Carbonate and Ethylene Carbonate on Graphite Electrodes, by M. Arakawa et al, 1995 (no month) Elsevier Science S.A., Journal of Power Sources 54, pp. 250–254, (Arakawa et al).
Aspects of Carbon Materials as Negative Electrodes for Lithium Secondary Batteries, by K. Tatsumi et al, Osaka Kogyo Gijutsu Shikensho Kiho (Bulletin of the Govern. Ind. Res. Inst., Osaka) 42 (3), 1991 (no month) (Tatsumi et al).
Technological Advances, 1993 (no month) Elsevier Science Publishing Co.. Mat Tech 8(3/4):39–45.

(List continued on next page.)

Primary Examiner—John S. Maples
Attorney, Agent, or Firm—Frederick J. McCarthy

[57] ABSTRACT

This invention relates to an electrode for a coke/alkali metal electrochemical cell comprising:

(a) calcined coke particles:
  (i) that contain at least 0.5 weight percent of nitrogen heteroatoms and at least 1.0 weight percent sulfur heteroatoms, and
  (ii) that have an average particle size from 2 microns to 40 microns with essentially no particles being greater than 50 microns.
(b) a binder This invention also relates to a coke/alkali metal electrochemical cell comprising:

(a) an electrode as described above,
(b) a non-aqueous electrolytic solution comprising an organic aprotic solvent and an electrically conductive salt, and
(c) a counterelectrode.

13 Claims, 5 Drawing Sheets

OTHER PUBLICATIONS

Electroic Characteristics of Various Carbon Materials for Lithium Rechargeable Batteries, by T. Iijima, Synthetic Metals 73 (1995) (no month), 9–20, (Iijima et al).

Studies of the Electrochemical Intercalation of Lithium Into Various Carbons, by C. Beck et al, Carbon '92, 5 International Carbon Conference, Jun. 1992 (Beck et al).

D. Guoyomard and J. M. Tarascon, J. Electrochem. Soc. 139, 937, Apr. 1992 (Guoyomard et al).

M. Jean, C. Desnoyer, A. Tranchant, and R. Messina, J. Electrochem. Soc. 142, 2122, Jul. 1995 (Jean et al).

W. J. Weydanz, B. M. Way, T. Van Buren and J. R. Dahn, J. Electrochem. Soc. 141, 900, Apr. 1994 (Weydanz et al).

K. Brandt, Solid State Ionics 69, 173, 1994 (no month) (Brandt).

"Heat Transfer Phenomena in Lithium/Polymer–Electrolyte Batteries for Electric Vehicle Application," by Yufei Chen and James W. Evans, J. Electrochem. Soc., vol. 140, No. 7, Jul. 1993, 1883–1838.

HETEROATOM INCORPORATED COKE FOR ELECTROCHEMICAL CELL ELECTRODE

GOVERNMENT CONTRACT

The work described and claimed in this patent application was conducted under Cooperative Agreement No. DE-FC02-91 CE50336 with the Department of Energy of the United States of America.

BACKGROUND OF THE INVENTION

1. Field of the Invention

This invention relates to the field of electrochemical cells, and, in particular, to the field of carbon-containing anodes for such electrochemical cells.

2. Description of Related Art

Many different carbon materials have been investigated for use in anodes for lithium/carbon electrochemical cells (i.e., electrochemical cells having anodes comprising at least partially crystalline carbon and "intercalated lithium"). Intercalated lithium is lithium that is bonded to the carbon in the carbon crystals by van der Waals forces. Key requirements for the carbon in such electrochemical cells are that the carbon has a high capacity both for reversible intercalation of the lithium during charging the cell and for deintercalation of the lithium during discharging the cell and that this high capacity be maintained with repetitive cycling.

Coke and graphite are two of the most commonly cited carbon materials for use in lithium/carbon electrochemical cells. Graphite is preferred for capacity since it can intercalate one lithium atom for every six carbon atoms (denoted as "$LiC_6$"). This corresponds to a deliverable electrochemical capacity of 372 mAh/gm (milliampere hours per gram) of carbon. However, graphite is known to show a high reactivity with many of the liquid electrolytes used in lithium/carbon electrochemical cells, resulting in substantial irreversibility and a continual loss in cell capacity on cycling. This effect can lead to a complete loss in capacity for an electrochemical cell.

Coke can generally intercalate one lithium atom for every 12 carbon atoms (denoted as "$LiC_{12}$") because coke has a less ordered crystalline structure than graphite. The degree of intercalation can also decrease with repetitive cycling for cokes but to a much lower extent than graphite. Therefore, the maximum sustainable capacity that has been achieved with coke is about 186 mAh/gm. By way of illustration, Guoyomard and Tarascon, *J. Electrochem, Soc.* 139, p. 938 present several references for the use of "Conoco electrode coke" which gives only "50% $LiC_6$." where "% $LiC_6$" denotes the percent of the lithium atoms in the carbon that are intercalated with six carbon atoms (i.e., "50% $LiC_6$" denotes $LiC_{12}$ or ½ $LiC_6$). M. Jean et al., *J. Electrochem, Soc.* 142, 2122 (1995) report 52% $LiC_6$ for coke. Japanese disclosure HEI-204361 shows low capacity (less than 100 mAh/g) for Conoco coke and pitch cokes.

It would be desirable to utilize a variety of coke as an anode in lithium/carbon electrochemical cells that would exhibit both high stability with respect to liquid electrolytes and an electrochemical capacity closer to that of graphite.

U.S. Pat. Nos. 5,162,170 and 5,176,969 disclose lithium secondary batteries stated to have a large electrode capacity, excellent charging and discharging cycle characteristics and flexibility wherein the negative electrode has an active substance carried on a carbonaceous material and a binder or a conductive polymer. In the carbonaceous material, other atoms such as nitrogen, oxygen and halogen may be also present at a ratio preferably of 7 mole percent or less, more preferably 4 mole percent or less, particularly preferably 2 mole percent or less. In the case of nitrogen, the foregoing mole percentages corresponds to weight percents of 2.8 weight percent, 1.6 weight percent and 0.8 percent. These patents disclose no specific exemplification of the use of any carbonaceous material containing nitrogen in a secondary battery.

A subsequent publication [Behavior of Nitrogen-Substituted Carbon ($N_zC_{1-z}$) in Li/Li($N_zC_{1-z})_6$ Cells by W. J. Weydanz, B. M. Way, T. van Buuren, and J. R. Dahn, *J. Electrochem. Soc.*, Vol. 141, No. 4, April 1994, 900–907] discloses that nitrogen-containing carbons have been made from different precursors at temperatures between 850° and 1050° C. This publication discloses carbons containing from 0 to 8.53 percent nitrogen by weight and concludes that such nitrogen-containing carbons are not considered useful as anodes for lithium-ion cells.

SUMMARY OF INVENTION

This invention provides an electrode for a coke/alkali metal electrochemical cell comprising:

(a) calcined coke particles:
  (i) that contain at least 0.5 weight percent (preferably 1 to 2 weight percent) of nitrogen heteroatoms and at least 1.0 weight percent (preferably 1 to 3 weight percent) sulfur heteroatoms, and
  (ii) that have an average particle size from 2 microns to 10 microns with essentially no particles being greater than 50 microns.

(b) a binder

The coke can contain up to 3 weight percent or more nitrogen and up to 10 weight percent or more sulfur. Such coke is hereinafter referred to as "heteroatom incorporated coke".

This invention also provides coke/alkali metal electrochemical cell comprising:

(a) an electrode as described above,
(b) a non-aqueous electrolytic solution comprising an organic aprotic solvent and an electrically conductive salt, and
(c) a counterelectrode Electrodes of the present invention give capacities as high as 70% $LiC_6$ with very good electrolyte stability. This high capacity is maintained over repetitive cycles. This capacity is about 40% higher than achieved with conventional coke and is closer to that achieved for graphite (90% $LiC_6$ is usually achieved with graphite). It is believed that the nitrogen and sulphur substituents in the carbon framework of the coke used in the present invention act to polarize the carbon structure and thus increase the interaction with lithium intercalated in the coke electrode during operation of the electrolytic cell. This increased capacity due to the presence of the heteroatoms is unexpected in view of the above-mentioned disclosure of Weydanz et al.

DETAILED DESCRIPTION OF INVENTION

The heteroatom incorporated coke employed in the electrodes of the present invention is produced by a process that comprises:

(a) calcining at 1000° C. to 1500° C. a coke starting material that contains at least 0.5 weight percent nitrogen heteroatoms and at least 1.0 weight percent sulfur heteroatoms to produce a calcined coke, and (b) milling the calcined coke to produce the desired coke having an average particle size from 2 microns to 40 microns (preferably from 3 microns to 40 microns) with essentially no particles greater than 50 microns (e.g., less than 15 weight percent—and preferably less than 5 weight percent—of the coke particles are greater than 50 microns). The calcined and milled coke so produced has the same (or higher) heteroatom content as the petroleum coke starting material. The calcined and milled coke also has the following properties:

| crystalline properties | x-ray interlayer spacing of 3.40 Å to 3.70 Å crystallite size (Lc) of 10 Å to 30 Å |
|---|---|
| helium density | 1.95 to 2.20 grams per cubic centimeter |

Suitable coke starting materials for producing the heteroatom incorporated coke employed in the electrodes of the present invention by calcining and milling have the following properties:

| nitrogen | 0.5 wt % to 2.0 wt % |
|---|---|
| sulfur | 1.0 wt % to 4.0 wt % |
| surface area | 5 to 20 square meters per gram |
| ash | less than 1.0 wt. % (preferably less than 0.5 wt. %) |

These coke starting materials are produced by carbonizing high nitrogen and high sulfur-containing coke starting materials which are derived from coal tar and petroleum and which have not been pretreated to remove sulfur and nitrogen heteroatoms. These starting materials include petroleum residues, coal tars, petroleum and coal tar distillates. These starting materials are then calcined and milled as described in more detail below.

In the practice of the present invention, the calcining of the petroleum coke can be conducted in any suitable apparatus (e.g., in a rotary hearth, in a rotary kiln calciner or in a suitable laboratory furnace). The calcining temperature is from 900° C. to 1500° C. The milling of the calcined petroleum coke can be conducted in any suitable milling apparatus such as a ball mill, jet mill or an attrition mill. The milling is conducted so as to reduce the average coke particle size to from 2 microns to 40 microns (preferably to from 3 microns to I 0 microns with essentially no particles greater than 50 microns. The presence of substantial amounts of large coke particles (particles greater than about 50 microns) is undesirable since it impedes electrochemical performance. These large particles prevent the formation of the desired uniform thin coating of the coke on the substrate (e.g., foil) usually employed in fabricating the electrode and can result in electrochemical shorting and premature failure of the cell.

Heteroatom Incorporated Coke Electrodes

The heteroatom incorporated coke particles are used to produce an electrode utilizing any of the components conventionally used to produce coke electrodes for electrochemical cells. Typically, the heteroatom incorporated coke particles are used in conjunction with a binder. Suitable binders include polyvinylidene fluoride and ethylene-propylene-diene terpolymers. Suitable other ingredients include electrically conductive carbon. From 3 to 30 weight percent of the binder and from 0 to 10 weight percent (preferably from 2 to 6 weight percent) of the electrically conductive carbon can be used based on the weight of the graphite, binder and any electrically conductive carbon. The binders and electrically conductive carbons used in the electrodes of the present invention are the same binders and conductive carbons used in known coke electrodes. The coke-binder-electrically conductive carbon mixture can be used coated on a substrate (e.g., on a metallic foil substrate such as copper or stainless steel foil). The above-mentioned components are formed into an electrode by any suitable means (e.g., by casting or hot pressing). The geometric structure of the heteroatom incorporated coke electrode can be cylindrical, rectangular or any other suitable shape.

Electrochemical Cells

Figure 1:
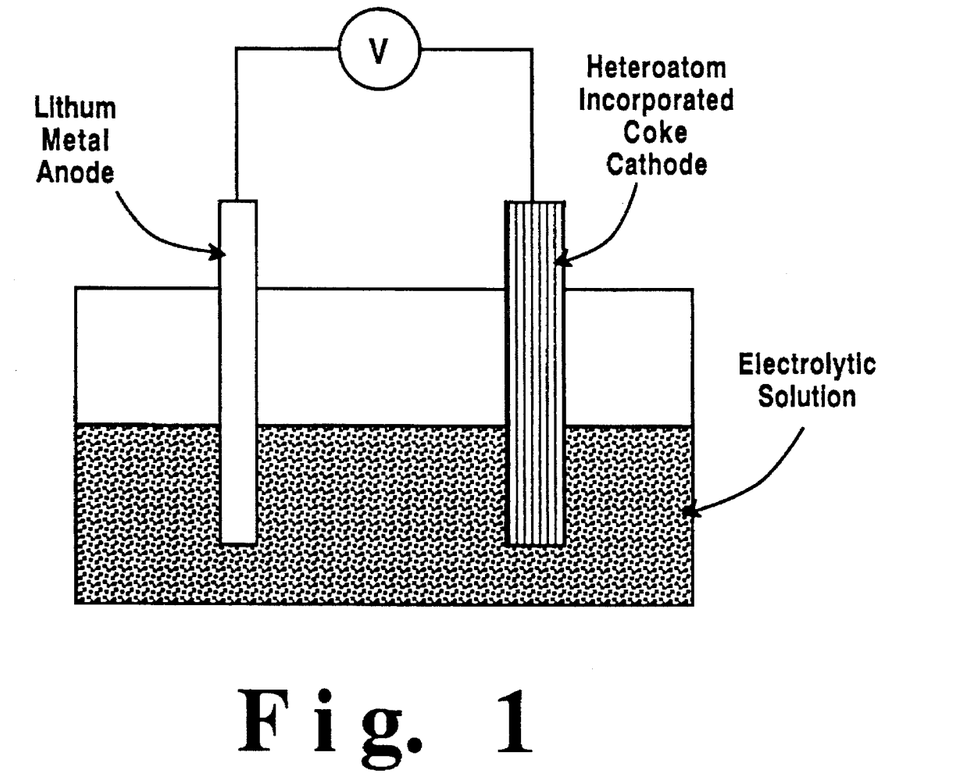
FIG. 1 shows an electrochemical cell of the present invention where the electrode of the present invention is the cathode.
Figure 2:
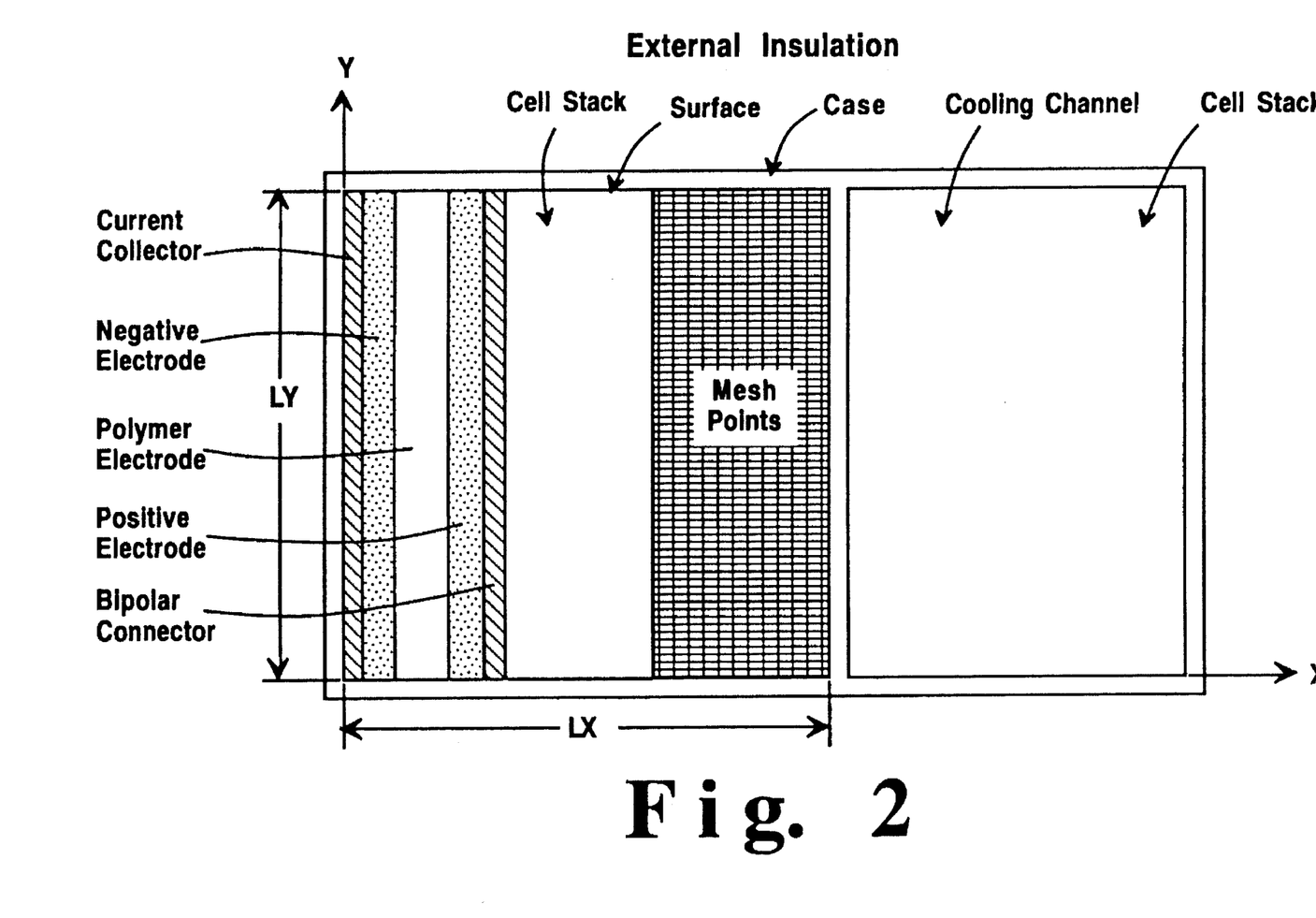
FIG. 2 shows an electrochemical cell of the present invention where the electrode of the present invention is the anode.

The heteroatom incorporated coke electrodes of the present invention are used in electrochemical cells comprising:

(a) a heteroatom incorporated coke electrode as described above, (b) a non-aqueous electrolytic solution comprising an organic aprotic solvent, and an electrically conductive salt of an alkali metal, and (c) a counterelectrode Illustrative of such electrochemical cells are the electrochemical cells shown in FIGS. 1 and 2. These electrochemical cells are rechargeable (secondary) electrochemical cells.

The electrodes of this invention contain heteroatom incorporated coke which reversibly intercalates alkali metals. Various of the materials useful in counterelectrode (e.g., metal oxides such as manganese dioxide) also reversibly intercalate alkali metals (or otherwise reversibly incorporate alkali metals in their crystalline structure by van der Waals forces). When such electrodes and counterelectrodes are present in the electrochemical cells, the cells are of the "rocking chair" or "alkali metal ion" variety. Such cells are a preferred embodiment of the present invention.

Non-Aqueous Electrolytic Solutions

In the non-aqueous electrolytic solutions used in the electrochemical cells of the present invention, suitable electrically conductive salts include the alkali metal salts of halides, halates, perhalates, haloaluminates, haloarsenates, halophosphates, haloacetates, phosphates, thiocyanates, sulfides, sulfates, cyanides, picrates, acetylacetonates, fluoroborates, hydrides, borohydrides, and so forth. The electrolyte salt should be compatible with both the cathode-active material, the highly graphitic carbonaceous anode material and the sequestering agent. When the alkali metal is lithium, suitable lithium electrolyte salts include $LiMn_2O_4$, $LiCoO_2$, $LiNO_2$, $LiAsF_6$, $LiPF_6$, $LiClO_4$, $LiBF_4$, $LiB(C_4H_5)_4$, $LiCF_3SO_3$, $LiN_9CF_3SO_2)_2$, $LiSO_3F$, $LiAlCl_4$, $LiBr$, and mixtures thereof. $LiAsF_6$, $LiMn_2O_4$, $LiCoO_2$ and mixtures thereof are preferred. Preferably, a 0.5 to 3.0 molar solution of the salt is employed.

In the non-aqueous electrolytic solutions used in the electrochemical cells of the present invention, suitable organic aprotic solvents include solid polymer electrolytes such as polyethylene oxide and polyacrylonitrile; Lewis bases such as the tertiary amines; amides and substituted amides such as formaide; nitriles such as acetonitrile, propionitrile and benzonitrile; open chain and cyclic esters such an alkylene carbonates (e.g., as propylene carbonate) and alkyl carbonates (e.g., diethyl carbonate), alkyl acylates and butyrolactone; oxysulfur compounds such as dimethylsulfoxide, dimethylsulfite and tetramethylene sulfone; and, open chain and cyclic ethers such as the poly (alkyleneoxy) glycols, dioxane and the substituted dioxanes, dioxolane, tetrahydrofuran and tetrahydropyran. Such nonaqueous electrolytic solutions can also contain optional components such as sequestering agents (e.g., glyme and crown ethers). Preferred non-aqueous electrolytic solutions used in the present invention comprise a lithium salt and at least one alkylene or dialkyl carbonate or solid polymer electrolyte as a solvent.

Counterelectrodes

The counterelectrodes in the electrochemical cells of the present invention are selected so that there is a potential difference between the counterelectrode and the above-described electrode containing the heteroatom incorporated coke. The electrode having the higher potential is the cathode.

Suitable counterelectrodes can be made from an electrically active material such as metal-chalcogen combinations, (particularly transition metal-chalcogen combinations), metal halides, and the like. Such chalcogens to include the chemically-related elements from Group VI of the periodic table, namely oxygen, sulfur, selenium, tellurium and polonium. Preferred transition metals include manganese, nickel, iron, chromium, titanium, vanadium, molybdenum and cobalt. Preferred electrically active materials for the counterelectrode include molybdenum sulfides, vanadium oxides and manganese oxides such as $MoS_2$, $V_6O_{13}$, $CoO_2$ and $MnO_2$. Preferably the counterelectrode is capable of intercalating or otherwise incorporating lithium into its crystalline lattice.

The counterelectrode may include the above-described electrically-active material in particulate form with a suitable conventional polymeric binder such as ethylene-propylene-diene terpolymer ("EPDT"), a polyfluorinated hydrocarbon such as polytetrafluorethylene ("PTFE") or polyethylene oxide ("PEO"). Preferably, about 4 wt. % by weight or less of the binder based on the amount of the counterelectrode material is used. Such binders are those used in known counterelectrodes. This counterelectrode can also contain additives such as electrically conductive carbon.

Cell Fabrication

In assembling the electrochemical cells of the present invention, the counterelectrode can be fabricated by depositing a slurry of the cathode material, an electrically conductive inert material as described above for the counterelectrodes, a binder and a fugitive liquid carrier (such as cyclohexane), on a cathode current collector, and then evaporating the carrier to leave a coherent mass in electrical contact with the current collector.

Likewise, the electrode containing the heteroatom incorporated coke in particulate form can be mixed with a suitable inert polymeric binder. Expansion and contraction of the electrode during cell cycling can cause the coke particles to lose electrically conductive contact with one another. Conductivity can be similarly enhanced by adding an electrically-conductive material, such as carbon black, to the electrode. The electrode can be fabricated by depositing a slurry of the heteroatom incorporated coke particles, an electrically-conductive inert material, a binder and a fugitive liquid carrier such as cyclohexane on an electrically-conductive anode support and then evaporating the carrier to leave a coherent mass in electrical contact with the support.

The heteroatom incorporated coke electrodes and counterelectrodes in the cells of the present can be intercalated with an alkali metal by the means known in the art (e.g., by the means disclosed in U.S. Pat. No. 5,028,500 and European Patent Application 0 474 183 A2—the disclosures of which are incorporated herein by reference). By way of illustration, if the cathode-active material is non-lithiated or insufficiently lithiated, a sheet of lithium metal foil can be sandwiched between either the anode assembly or the cathode assembly and the porous separator. A sheet of lithium foil can be placed between the anode and the separator so that the surface of the sheet is coextensive with the surface of the anode and the thickness of the sheet is chosen so that the correct amount of lithium is present for intercalation into the anode. The layered assembly can then be wound around the metallic center post to form a spiral assembly that is then placed into the cell container to which is added the electrolyte solution into which the sequestering agent has been dissolved. The cell container can then be covered with the cell cap.

Electrode conductors for attachment to the anode and cathode are used in the electrochemical cells of the present invention. Among the satisfactory electrode conductors are tungsten, aluminum, stainless steel, steel, graphite, lead oxide, platinum, copper, nickel, silver, iron and brass.

Improvements

Electrodes of the present invention have capacities as high as 70% $LiC_6$ with very good stability toward electrolytes. The high capacity is maintained over repetitive recycling. This capacity is about 40% higher than achieved with conventional coke and is closer to that achieved for graphite (90% $LiCl_6$ is usually achieved with graphite). It is postulated that the nitrogen and sulphur substituents in the carbon framework of the coke used in the present invention act to polarize the carbon structure and thus increase the interaction with lithium intercalated in the coke electrode during operation of the electrolytic cell.

The capacities of the electrochemical cells of the present invention can be improved even further by using as the heteroatom incorporated coke in the electrode compacted coke described and claimed in commonly assigned U.S. patent application Ser. No. 08/654,644 filed concurrently herewith in the names of irwin Charles Lewis and Ronald Alfred Greinke, entitled "Compacted Carbon For Electrochemical Cells". The disclosure of said concurrently filed Union States patent application is incorporated herein by reference. The following Examples illustrate the present invention:

EXAMPLE 1

A petroleum coke starting material was calcined at 1400° C. to produce a calcined coke. This calcined coke was then milled in a jet mill at about 25° C. to produce a powered coke having an average particle size of 4.0 microns and having 0 wt % by weight of particles over 50 microns. The calcined and milled coke so produced had the following properties:

| | |
|---|---|
| surface area = | 16 $m^2/gm$ |
| helium density = | 2.084 g/cc |

| | |
|---|---|
| X-ray interlayer spacing = | 3.460 Å |
| Lc (crystallite size) = | 37.0 Å |
| % by weight C | 96.7 |
| % by weight H | 0.07 |
| % by weight N | 1.13 |
| % by weight S | 0.84 |
| Total (N + S % by weight) | 1.97 |

Figure 3:
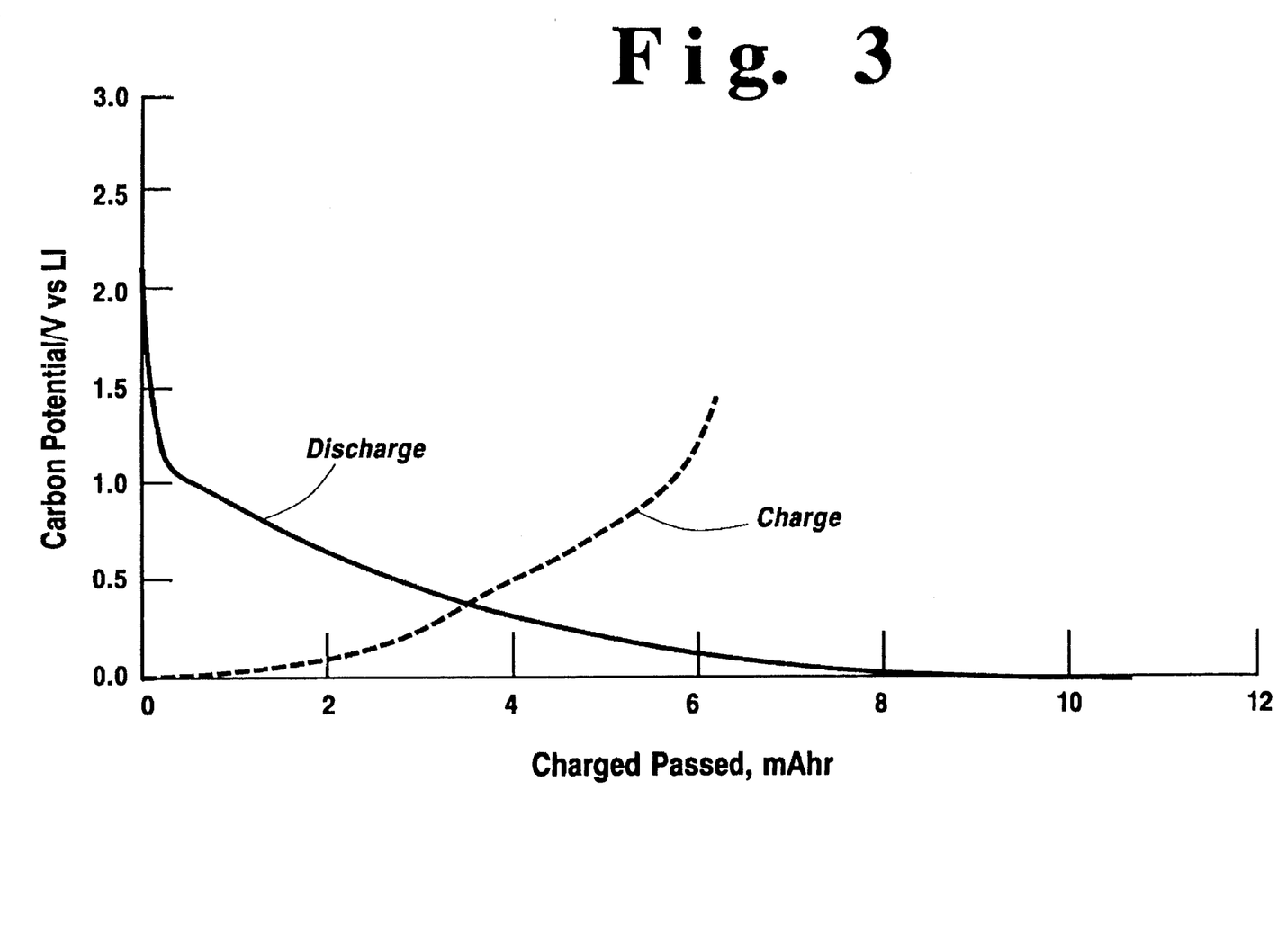
FIG. 3 shows an initial charge/discharge curve illustrating the performance of an electrochemical cell of the present invention.
Figure 4:
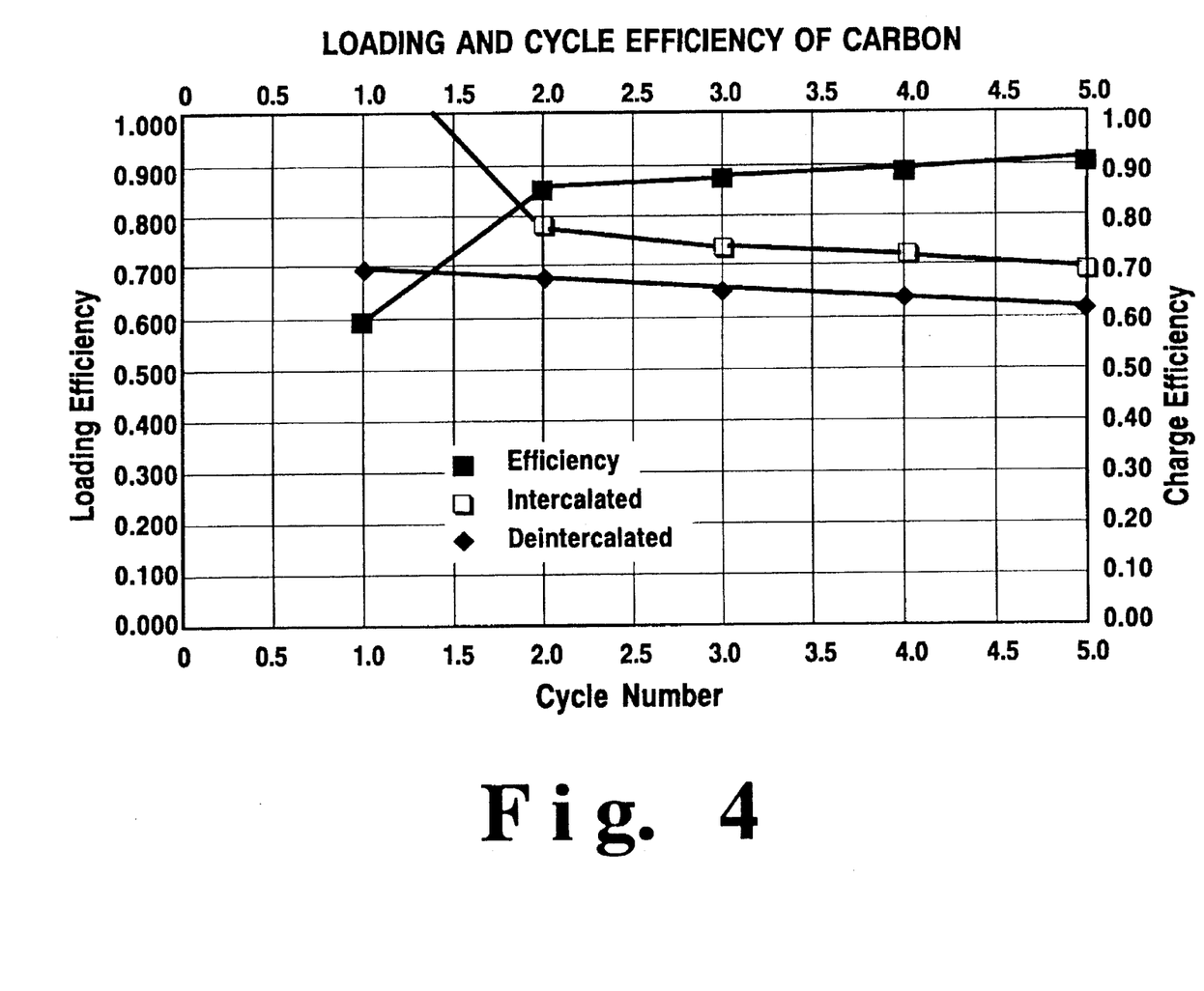
FIG. 4 shows curves illustrating the performance of an electrochemical cell of the present invention for five charge/discharge cycles.

The calcined and milled coke was used as the cathode in the test cell shown in FIG. 1. The cells for testing were constructed using metallic lithium foil as the anode and the calcined and milled coke under test as the cathode. The electrolyte consisted of 1 Molar $LiPF_6$ in 50% propylene carbonate and 50% ethyl carbonate as solvent. The coke was cast into a film on to a nickel foil using a slurry of the calcined and milled coke with 5% of a polyvinylidene fluoride (PVDF) binder and 4% non-intercalating carbon black (commercially available as "Super S") in cyclohexane. The film coating was adjusted to give 3 to 8 milligram per square centimeter of dried electrode coating. The coating was dried by heating to 200° C. for 2 hours and then kept at 100° C. prior to use. The total electrode area was 5 cm². The cells were cycled at constant current between the potential limits of +2.5 volts to 0.00 volt. The discharge curves which represent intercalation of lithium into the coke and the charge curves which represent the deintercalation were measured over five cycles. The initial charge/discharge curve is shown in FIG. 3. The cell was cycled for five charge/discharge cycles and the results shown in FIG. 4. The capacity of the cell as measured from the first discharge cycle was 78% of $LiC_6$ or 290 mAh/g. After five cycles, the intercalation capacity was still 70% of $LiC_6$ or 260 mAh/g. The cell efficiency (the ratio of discharge to charge capacity) was 92%.

EXAMPLE 2

As a comparison, a cathode was prepared and tested under the conditions of Example 1 above using a calcined and milled petroleum coke (commercially available as "Conoco XP" from Conoco Incorporated) with a low heteroatom content. The calcined and milled comparative coke has an average particle size of 4.3 microns and the following properties:

| | |
|---|---|
| Surface area = | 25 m²/gm |
| Helium density = | 2.131 g/cc |
| X-ray interlayer spacing = | 3.455 Å |
| Lc (crystallite size) = | 40 Å |
| % wt. C | 98.6 |
| % wt. H | 0.37 |
| % wt. N | 0.21 |
| % wt. S | 0.57 |
| Total (N + S %) | 0.78 |

Figure 5:
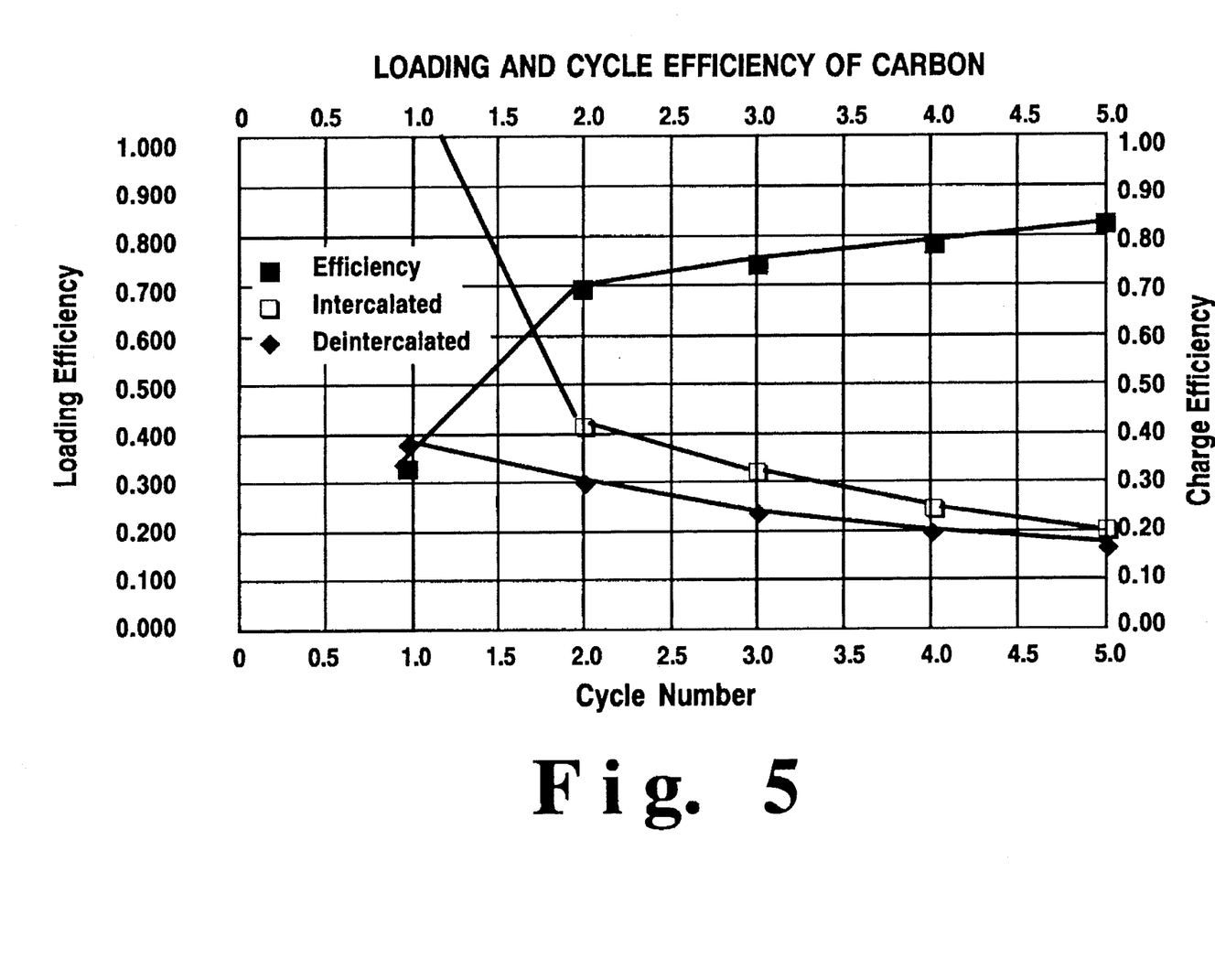
FIG. 5 shows a curve illustrating the performance of a comparative electrochemical cell for five charge/discharge cycles.

The capacity and efficiency of the comparative cell as a function of cycling are shown in FIG. 5. After five cycles the intercalation capacity is only 20% $LiC_6$ or 74 mAh/g.

EXAMPLE 3

The configuration of the electrochemical cells of this invention can incorporate the features of the cell shown in "Heat Transfer Phenomena in Lithium/Polymer-Electrolyte Batteries for Electric Vehicle Application," by Yufei Chen and James W. Evans, J. Electrochem. Soc., Vol. 140, No. 7, July 1993, 1833–1838. This cell is shown in FIG. 2 herein. As shown in FIG. 2, a cell consists of a lithium negative electrode (consisting of lithium, heteroatom incorporated coke and a polyvinylidene fluoride binder), polymer electrolyte (polyethyene oxide containing an electrically conductive lithium salt) and composite positive electrode (containing $MnO_2$) as well as bipolar connector/current collectors. A battery/stack is composed of many parallel-connected units and each unit is composed of many series-connected, bipolar cells. This design is adopted in the Harwell prototype and is expected to exhibit high specific energy. (See A. Hooper, in Solid-State Batteries, C. A. C. Sequeira and A. Hooper, Editors, p. 399, NATO ASI Series, Martinus Nijhoff, Amsterdam (1985) relating to the Harwell prototype).

What is claimed is:

1. An electrode for a coke/alkali metal electrochemical cell comprising:
   (a) calcined coke particles:
      (i) that contain at least 0.5 weight percent of nitrogen heteroatoms and at least 1.0 weight percent sulfur heteroatoms, and
      (ii) that have an average particle size from 2 microns to 40 microns with essentially no particles being greater than 50 microns; and
   (b) a binder.

2. An electrode as claimed in claim 1 wherein the content of the nitrogen heteroatoms in the calcined coke is from 1 to 2 weight percent and wherein the content of the sulfur heteroatoms in the calcined coke is from 1 to 3 weight percent.

3. An electrode as claimed in claim 1 wherein the calcined coke and the binder are coated on a metallic foil substrate.

4. An electrode as claimed in claim 1 wherein the binder is polyvinylidene fluoride or an ethylene propylene-diene terpolymer.

5. An electrode as claimed in claim 1 which also contains electrically conductive carbon.

6. A coke/alkali metal electrochemical cell comprising:
   I. an electrode comprising,
      (a) calcined coke particles:
         (i) that contain at least 0.5 weight percent of nitrogen heteroatoms and at least 1.0 weight percent sulfur heteroatoms, and
         (ii) that have an average particle size from 2 microns to 40 microns with essentially no particles being greater than 50 microns,
      (b) a binder,
   II. a non-aqueous electrolytic solution comprising an organic aprotic solvent and an electrically conductive alkali metal salt, and
   III. a counterelectrode.

7. An electrochemical cell as claimed in claim 6 wherein the content of the nitrogen heteroatoms in the calcined coke is from 1 to 2 weight percent and wherein the content of the sulfur heteroatoms in the calcined coke is from 1 to 3 weight percent.

8. An electrochemical cell as claimed in claim 6 wherein the binder in the electrode is polyvinylidene chloride or an ethylene-propylene-diene terpolymer and wherein the electrode also contain electrically conductive carbon.

9. An electrochemical cell as claimed in claim 6 wherein the electrode is the anode, the counterelectrode is the cathode and wherein the counterelectrode comprises $MoS_2$, $V_6O_{13}$, $CoO_2$ or $MnO_2$ and a binder.

10. An electrochemical cell as claimed in claim 6 wherein the organic aprotic solvent is at least one alkyene or dialkyl carbonate or a solid polymer electrolyte and the electrolytically conductive salt is $LiAsF_6$, $LiMn_2O_4$ or $LiCoO_2$.

11. An electrochemical cell as claimed in claim 6 wherein the organic aprotic solvent is polyethylene oxide or polyacrylonitrile and the electrolytically conductive alkali metal salt is $LiAsF_6$, $LiMn_2O_4$ or $LiCoO_2$.

12. An electrochemical cell as claimed in claim 6 wherein the electrode is an anode containing reversibly intercalated lithium in the coke and the counterelectrode is a cathode comprising a metal oxide having lithium reversibly incorporated therein.

13. An electrochemical cell as claimed in claim 6 wherein the electrode also contains electrically conductive carbon.

* * * * *